US012502599B2

(12) United States Patent
Pliska

(10) Patent No.: US 12,502,599 B2
(45) Date of Patent: Dec. 23, 2025

(54) LASER EMITTING DART APPARATUS AND METHOD OF USE

(71) Applicant: James J. Pliska, Chatsworth, CA (US)

(72) Inventor: James J. Pliska, Chatsworth, CA (US)

( * ) Notice: Subject to any disclaimer, the term of this patent is extended or adjusted under 35 U.S.C. 154(b) by 500 days.

(21) Appl. No.: 17/561,940

(22) Filed: Dec. 25, 2021

(65) Prior Publication Data

US 2023/0201707 A1 Jun. 29, 2023

(51) Int. Cl.

| | |
|---|---|
| ***A63B 65/02*** | (2006.01) |
| ***A63F 9/02*** | (2006.01) |
| ***F41G 3/14*** | (2006.01) |
| ***F42B 6/00*** | (2006.01) |
| ***G02B 27/20*** | (2006.01) |

(52) U.S. Cl.
CPC ............ *A63F 9/0278* (2013.01); *F41G 3/145* (2013.01); *F42B 6/003* (2013.01); *G02B 27/20* (2013.01); *A63F 2009/0282* (2013.01)

(58) Field of Classification Search
CPC ............... F42B 6/04; F42B 6/08; F42B 6/003
See application file for complete search history.

(56) References Cited

U.S. PATENT DOCUMENTS 4,926,438 A 5/1990 Maes ............................ 372/109
5,153,375 A 10/1992 Equizabal ..................... 102/530
5,425,542 A * 6/1995 Blackwood ........... F42B 12/362
473/578
5,443,036 A 8/1995 Amiss ........................... 119/707
6,758,772 B1 * 7/2004 Chambers ............... F42B 6/003
473/578
7,231,721 B2 * 6/2007 Minica ...................... F42B 6/04
33/286
7,409,770 B2 * 8/2008 Jones ........................ F42B 6/04
124/87
8,251,845 B2 * 8/2012 Bay ......................... F41G 1/467
473/585
9,109,863 B2 * 8/2015 York ....................... F42B 12/34
9,310,173 B2 * 4/2016 Bay ........................ F42B 12/365
9,746,293 B2 * 8/2017 Cummings ............... F42B 6/06
9,823,046 B1 * 11/2017 Zajac ...................... F41G 1/467
10,161,731 B2 * 12/2018 Lish ....................... F42B 12/362
10,532,275 B2 1/2020 Moore .................. A63F 9/0291
2002/0071287 A1 6/2002 Haase ........................... 362/553
2003/0107177 A1 6/2003 Jancik ........................... 273/348
2007/0087873 A1 * 4/2007 Yiu ............................ F41J 3/00
473/578
2007/0187896 A1 8/2007 Moseley ....................... 273/371
2008/0216331 A1 * 9/2008 Jones .................... F42B 12/362
124/87

(Continued)

*Primary Examiner* — John A Ricci
(74) *Attorney, Agent, or Firm* — Michael R. Schramm

(57) ABSTRACT

Disclosed is a laser emitting dart apparatus (LEDA) and method of use. The LEDA provides for a dart apparatus that, by emitting a laser beam from a tip of the dart and projecting a laser dot onto a selected target, facilitates a dart user's aim by providing an indication of where the dart is likely to strike a selected target if the dart is thrown or projected in a substantially straight line from point of the user's grasp to the indicated laser dot projected onto the target. The invention further contemplates various charging cases or dart cradles that provide an electrical source to recharge a battery of the LEDA when the LEDA is not in use.

20 Claims, 11 Drawing Sheets

(56) References Cited

U.S. PATENT DOCUMENTS

| | | | | |
|---|---|---|---|---|
| 2016/0187113 | A1 * | 6/2016 | Donahoe | A63B 47/008 473/570 |
| 2016/0361626 | A1 | 12/2016 | Moore | A63F 9/0291 |
| 2017/0045345 | A1 * | 2/2017 | Román | F42B 12/385 |
| 2017/0326444 | A1 | 11/2017 | Hong | A63F 9/0278 |
| 2019/0234719 | A1 * | 8/2019 | Twomley | F42B 6/04 |
| 2021/0262773 | A1 * | 8/2021 | Kirsch | F42B 6/04 |

* cited by examiner

LASER EMITTING DART APPARATUS AND METHOD OF USE

FIELD OF THE INVENTION

The present invention relates to dart apparatuses, and in particular, to laser emitting dart apparatuses (LEDA) wherein a dart thereof emits a guidance laser so as to facilitate the improvement in aim of a dart user, and wherein the laser emitting dart apparatus is preferably combined with a charging case for recharging the laser emitting dart apparatus.

BACKGROUND OF THE INVENTION

Various means and apparatuses are known in the art for dart apparatuses and for laser emitting apparatuses. However, such prior art apparatuses are not heretofore known to provide the utility of the instant invention. Examples of such dart apparatuses and for laser emitting apparatuses are disclosed in the following list of US patents and applications, all of which are expressly incorporated herein by reference: U.S. Pat. No. 4,926,438 to Maes, U.S. Pat. No. 5,153,375 to Eguizabal, U.S. Pat. No. 5,443,036 to Amiss, U.S. Pat. No. 10,532,275 to Moore, 20020071287 to Haase, 20030107177 to Jancik, 20070187896 to Moseley, 20160361626 to Moore, and 20170326444 to Hong.

SUMMARY OF THE INVENTION

The present invention is a laser emitting dart apparatus (LEDA) and method of use. The LEDA provides for a dart apparatus that, by emitting a laser beam from a tip of the dart and projecting a laser dot onto a selected target, facilitates a dart user's aim by providing an indication of where the dart is likely to strike a selected target if the dart is thrown or projected in a substantially straight line from point of the user's grasp to the indicated laser dot projected onto the target. The invention further contemplates various charging cases or dart cradles that provide an electrical source to recharge a battery of the LEDA when the LEDA is not in use.

DESCRIPTION OF DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
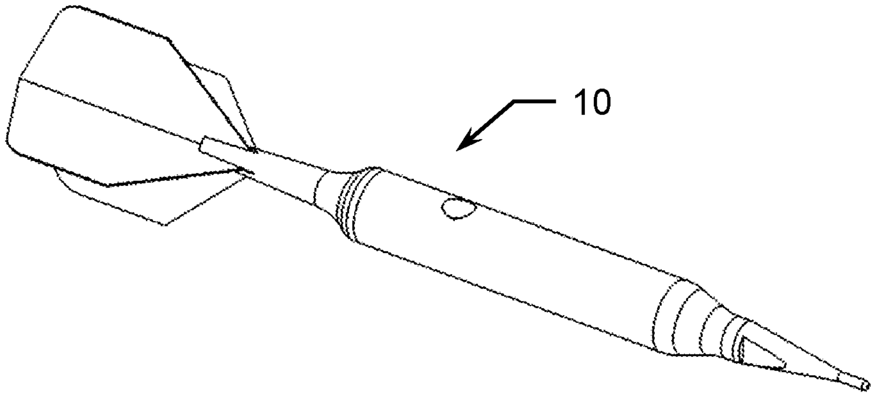
FIG. 1 is an assembled trimetric view of a LEDA.
Figure 2:
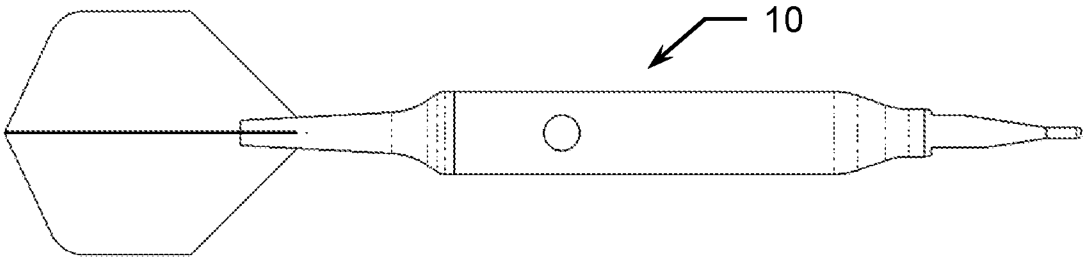
FIG. 2 is an assembled plan view of the LEDA.
Figure 3:
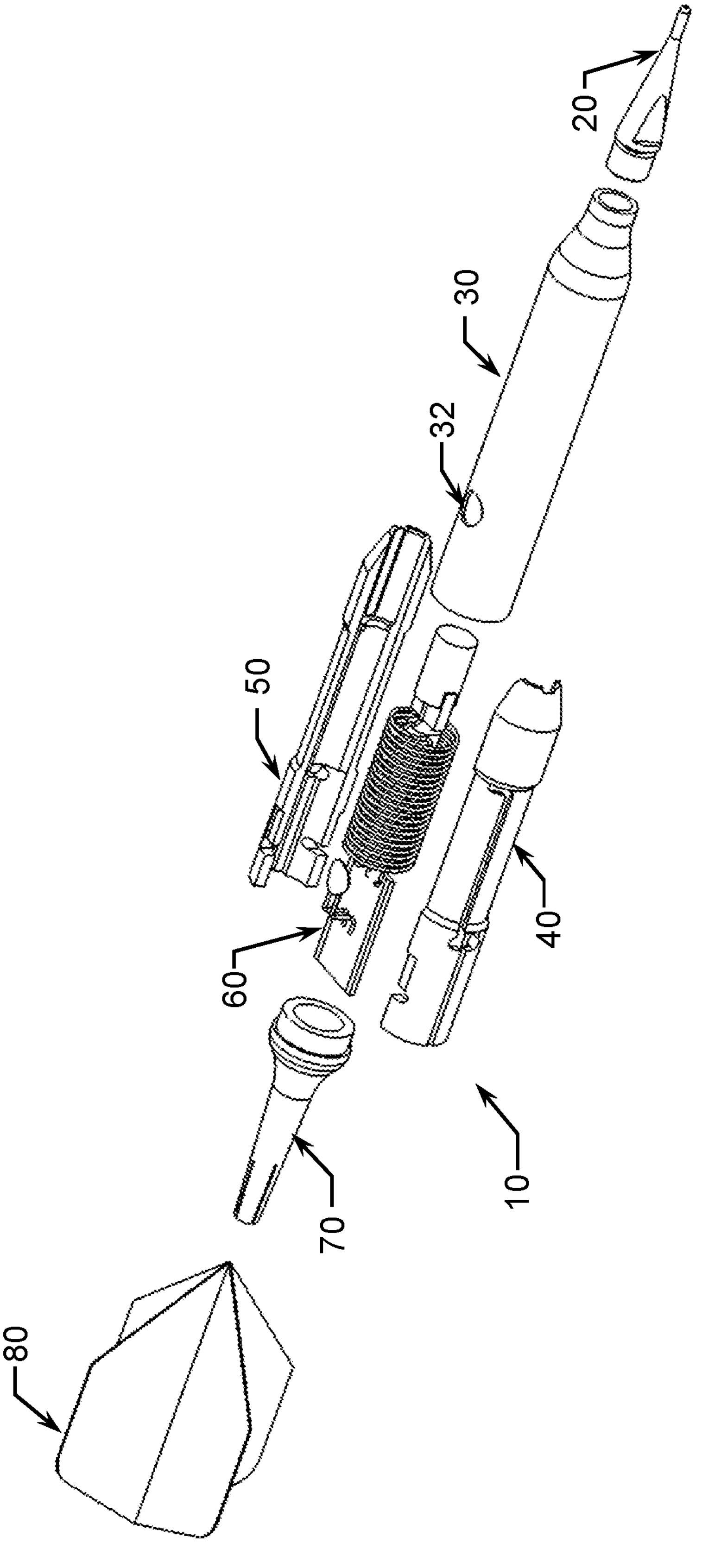
FIG. 3 is an exploded trimetric view of the LEDA.
Figure 4:
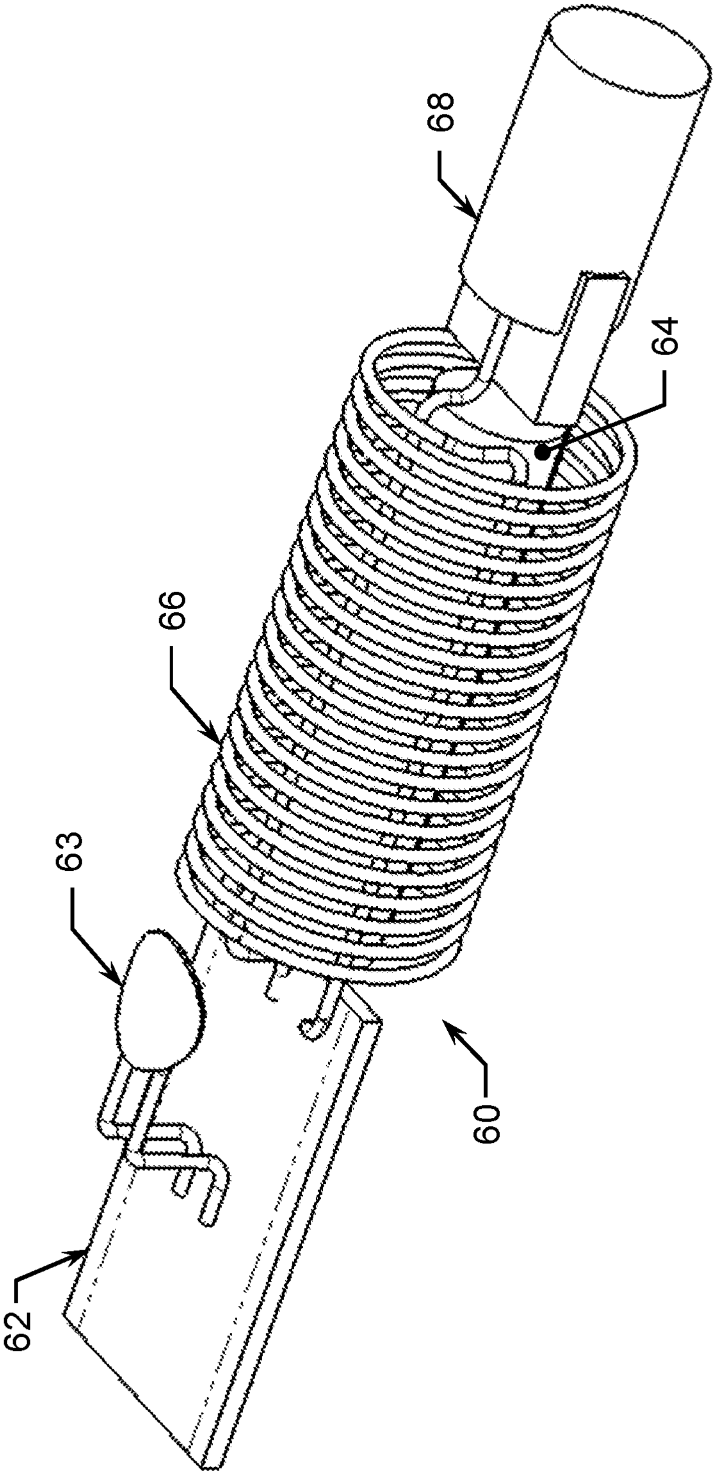
FIG. 4 is an assembled trimetric view of a PCB assembly of the LEDA.
Figure 5:
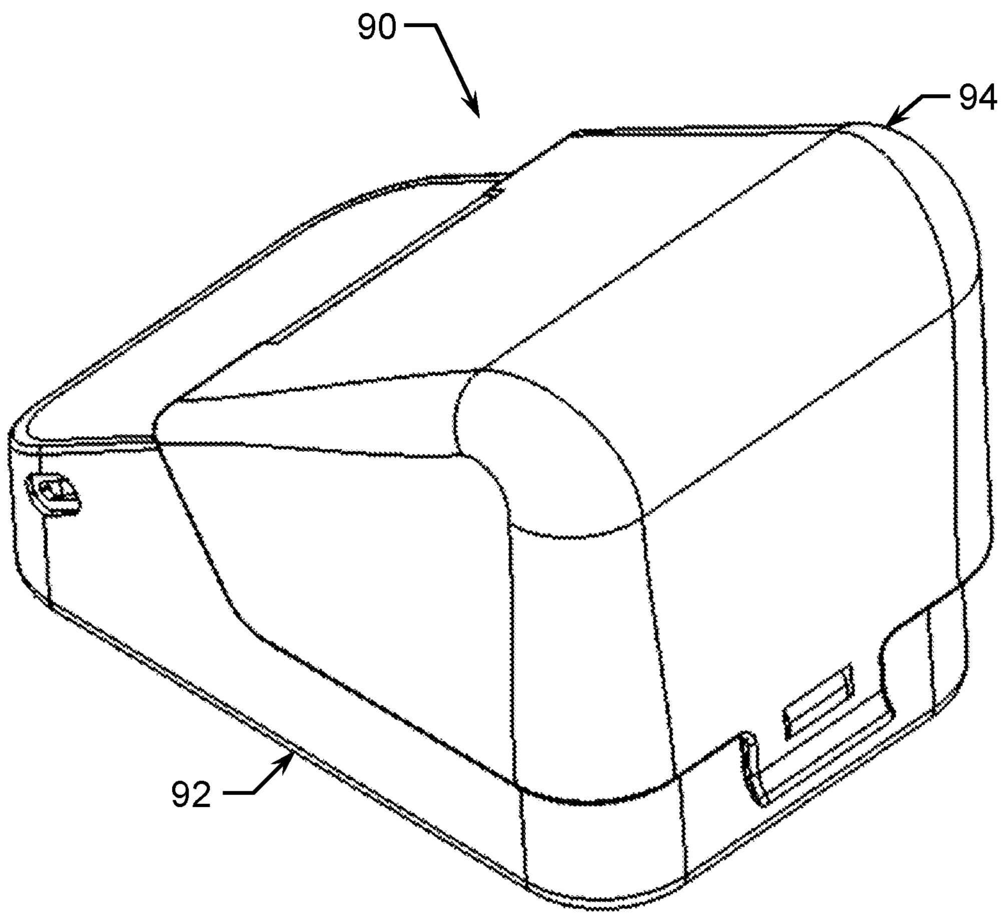
FIG. 5 is an assembled trimetric view of a fixed angle multi-unit charging case in a folded configuration.
Figure 6:
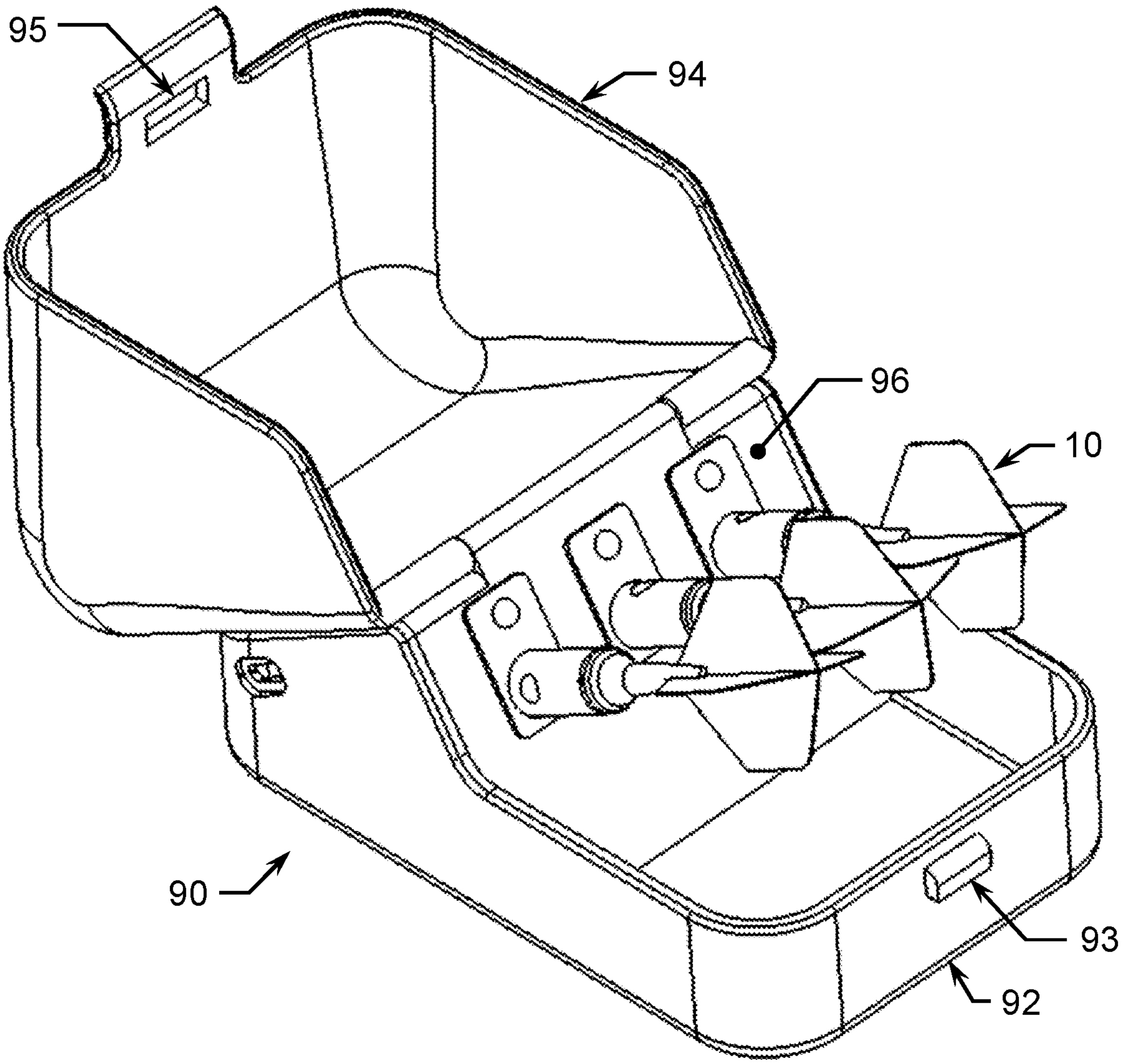
FIG. 6 is an assembled trimetric view of the fixed angle multi-unit charging case in a un-folded configuration.
Figure 7:
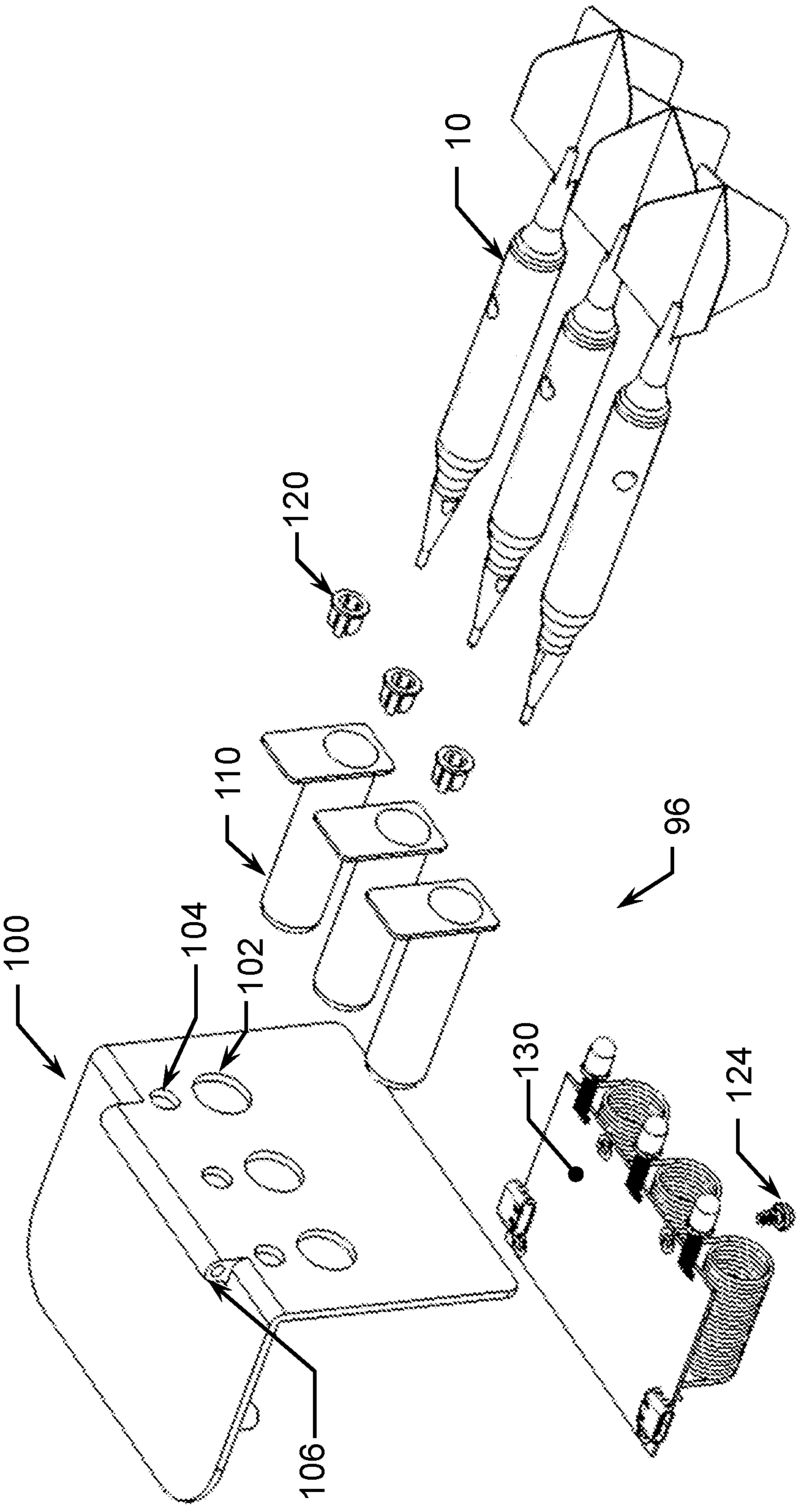
FIG. 7 is an exploded trimetric view of the components (except for the base and the lid) of the fixed angle multi-unit charging case in a un-folded configuration.
Figure 8:
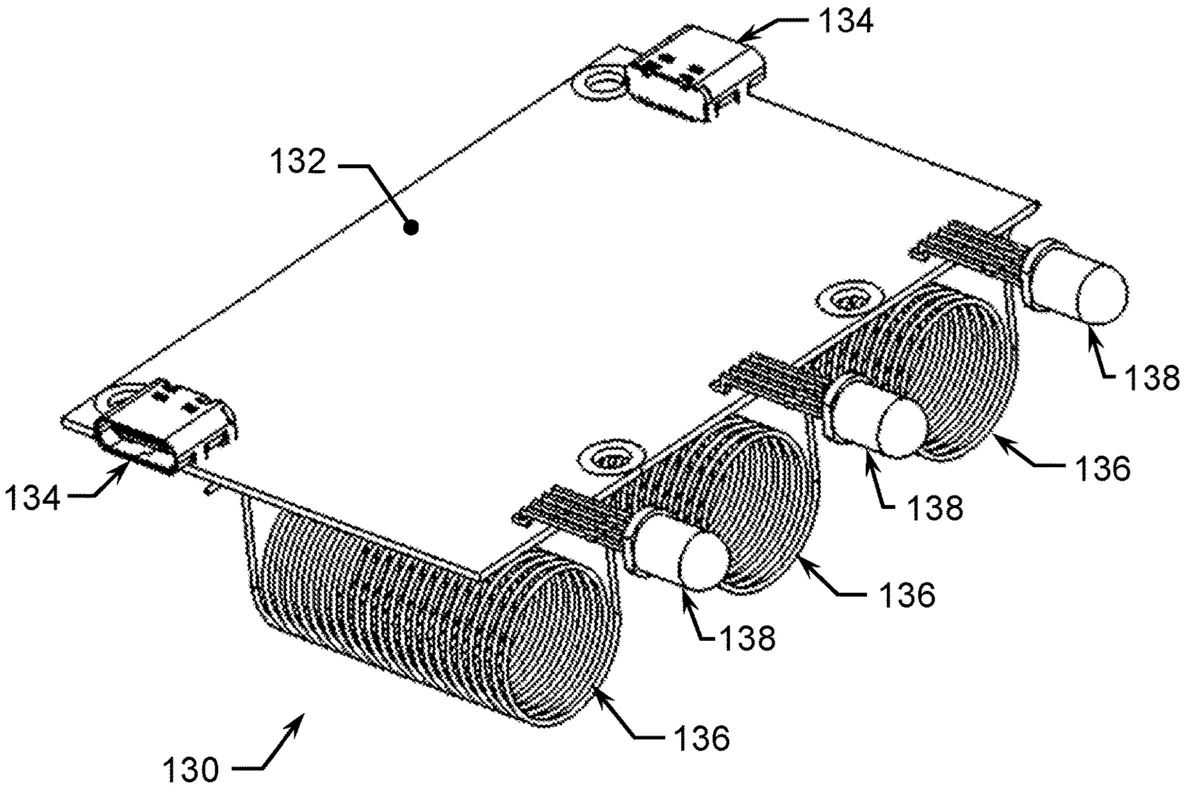
FIG. 8 is an assembled trimetric view of a PCB assembly of the fixed angle multi-unit charging case.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are included to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

In order to facilitate the understanding of the present invention in reviewing the drawings accompanying the specification, a feature table is provided below. It is noted that like features are like numbered throughout all of the figures.

FEATURE TABLE

| # | Feature |
|---|---|
| 10 | Laser emitting dart apparatus |
| 20 | Laser emitting tip |
| 30 | Body |
| 32 | Switch opening |
| 40 | First housing member |
| 50 | Second housing member |
| 60 | PCB assembly |
| 62 | PCB |
| 63 | Capacitive touch switch |
| 64 | Rechargeable battery |
| 66 | Inductive charging coil |
| 68 | Laser diode |
| 70 | Tail |
| 80 | Fletching |
| 90 | Fixed angle multi-unit charging case apparatus |
| 92 | Base |
| 93 | Latch knob |
| 94 | Lid |
| 95 | Latch hole |
| 96 | Charging module |
| 100 | Charging holder |
| 102 | Dart hole |
| 104 | Bezel hole |
| 106 | Hinge member |
| 110 | Dart holder |
| 120 | Bezel |
| 124 | Screw |

-continued

FEATURE TABLE

| # | Feature |
|---|---|
| 130 | PCB Assembly |
| 132 | PCB |
| 134 | USB |
| 136 | Inductive charging coil |
| 138 | LED |
| 140 | Variable angle multi-unit charging case apparatus |
| 150 | Variable angle single-unit charging case apparatus |

Referring now to the drawings, and in particular to FIG. 1 through FIG. 4, a first embodiment of LEDA 10 comprises laser emitting tip 20, body 30, first housing member 40, second housing member 50, PCB (printed circuit board—see: https://en.wikipedia.org/wiki/Printed circuit board) assembly 60, tail 70, and fletching (see: https://en.wikipedia.org/wiki/Fletching) 80 (comprising a plurality of fletches). Body 30 further includes switch opening 32. PCB assembly 60 further comprises PCB 62, capacitive touch switch 63, rechargeable battery 64, inductive charging coil 66, and laser diode 68.

PCB assembly 60 is assembled such that PCB 62, capacitive touch switch 63, rechargeable battery 64, inductive charging coil 66, and laser diode 68 form a substantially discreet component and such that PCB 62, capacitive touch switch 63, rechargeable battery 64, inductive charging coil 66, and laser diode 68 are all electrically connected so as to enable the electrical charging and discharging of rechargeable battery 64 and the selective transmission of an electrical when capacitive touch switch 63 is touched.

LEDA 10 is assembled such that first housing member 40 and second housing member 50 are placed in substantial enclosing contact with PCB assembly 60, and then first housing member 40, second housing member 50, and PCB assembly 60 are placed inside of body 30 such that capacitive touch switch 63 is accessible through switch opening 32. Laser emitting tip 20 is attached to a forward end of body 30, tail 70 is attached to a rearward end of body 30, and fletching 80 is attached to tail 70. As assembled, LEDA 10 is adapted such that PCB assembly 60 is electrically connected to laser emitting tip 20, and such that when capacitive touch switch 63 is touched and rechargeable battery 64 is charged, laser emitting tip 20 emits a directionally controlled laser beam. LEDA 10 is further adapted such that when LEDA 10 rests in a charging case, rechargeable battery 64 is recharged.

In practice, while grasping LEDA 10, a user touches capacitive touch switch 63 cause a directionally controlled laser beam to emit therefrom and the user guides the laser beam to (shine on) a selected target. With the selected target "painted" or illuminated, the user throws LEDA 10 at the illuminated target, preferably with greater/improved accuracy than what the user would otherwise have had by using a conventional non-laser-emitting dart.

Referring now to the drawings, and in particular to FIG. 5 through FIG. 8, in an additional embodiment of the invention, LEDA 10 is provided in combination with fixed angle multi-unit charging case apparatus (FAMUCCA) 90 comprising base 92 having latch knob 93, lid 94 having latch hole 95, and charging module 96. Charging module 96 further comprises charging holder 100 having a plurality of dart holes 102, a plurality of bezel holes 104, and hinge 105, hinge member 106, a plurality of dart holders 110, a plurality of bezels 120, a plurality of screws 124, and PCB assembly

130. PCB assembly 130 further comprises PCB 132, a plurality of USBs 134, a plurality of inductive charging coils 136, and a plurality of LEDs 138.

PCB assembly 130 is assembled such that PCB 132, USBs 134, inductive charging coils 136, and LEDs 138 form a substantially discreet component and such that PCB 132, USBs 134, inductive charging coils 136, and LEDs 138 are all electrically connected so as to enable receiving electrical power via USBs 134, so as to charge/re-charge a LEDA 10 when a LEDA 10 is placed within a dart holder 110, and so as to selectively illuminate LEDs 138.

Charging module 96 is assembled such that dart holders 110 are connected to dart holes 102, bezels 120 are connected to bezel holes 104, and PCB assembly 130 is attached to charging holder 100.

FAMUCCA 90 is assembled such that charging module 96 is connect to (within) base 92 such that USBs 134 are accessible, and lid 94 is hingedly connected to hinge member 106. As assembled, FAMUCCA 90 is adapted such that lid 94 is swivelable relative to base 92, and such that when a LEDA 10 rests in a dart holder 110, a respective LED 138 is illuminated while the LEDA 10 is charged/re-charged. It is noted that FAMUCCA 90 may also include a rechargeable battery which is recharged while FAMUCCA 90 is connected to an electrical power source via a USB 134. It is further noted that FAMUCCA 90 may optionally illuminate an LED 138 to a first color (e.g. white) when under power but no LEDA 10 is in a dart holder 110, illuminate an LED 138 to a second color (e.g. red) when under power and charging a LEDA 10, and illuminate an LED 138 to a third color (e.g. green) when under power but a LEDA 10 resting in a dart holder 110 is substantially fully charged.

In practice, when a user is not using a LEDA 10, a user opens FAMUCCA 90 which is under power either from an external electrical power source or a battery power source, and for which an LED 138 is preferably illuminated a first color, and places at least one LEDA 10 in a dart holder 110 of FAMUCCA 90. When a LEDA 10 is placed in a dart holder 110, LEDA 10 begins to be charged/re-charged, and an LED 138 preferably changes to illuminate a second color. When a LEDA 10 is substantially fully charged, an LED 138 preferably changes to illuminate a third color indicating that a LEDA 10 is (substantially) fully charged. When ready, a user then withdraws LEDA 10 and uses LEDA 10.

Figure 9:
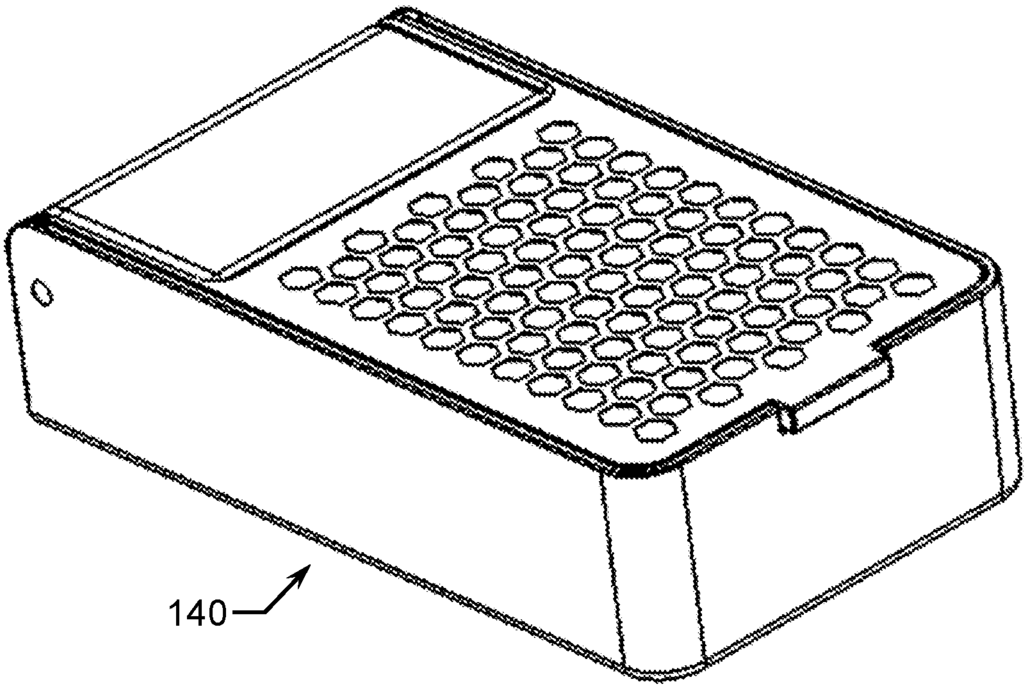
FIG. 9 is an assembled trimetric view of a variable angle multi-unit charging case in a folded configuration.
Figure 10:
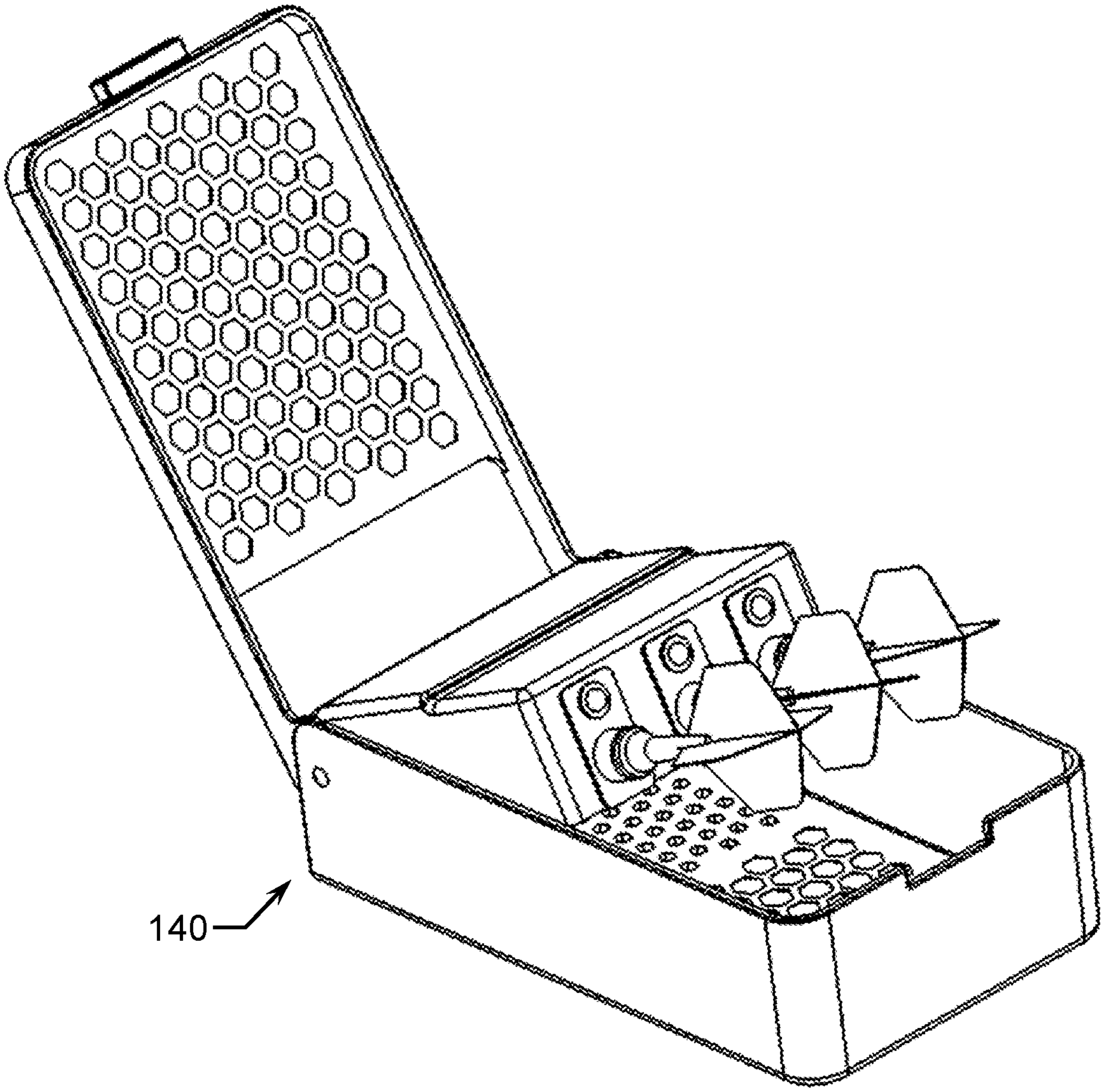
FIG. 10 is an assembled trimetric view of the variable angle multi-unit charging case in a un-folded configuration.

Referring now to the drawings, and in particular to FIG. 9 through FIG. 10, in a further additional embodiment of the invention, LEDA 10 is provided in combination with variable angle multi-unit charging case apparatus (VAMUCCA) 140. VAMUCCA 140 is substantially similar to FAMUCCA 90 except that VAMUCCA 140 is adapted to vary an angle at which the charging module thereof is presented.

Figure 11:
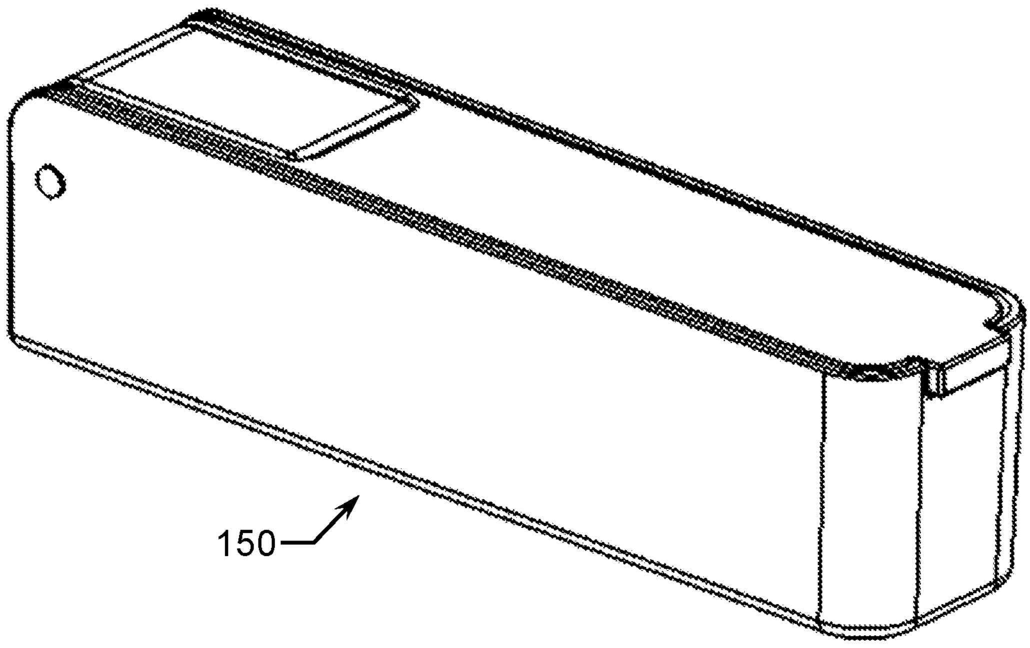
FIG. 11 is an assembled trimetric view of a variable angle single-unit charging case in a folded configuration.
Figure 12:
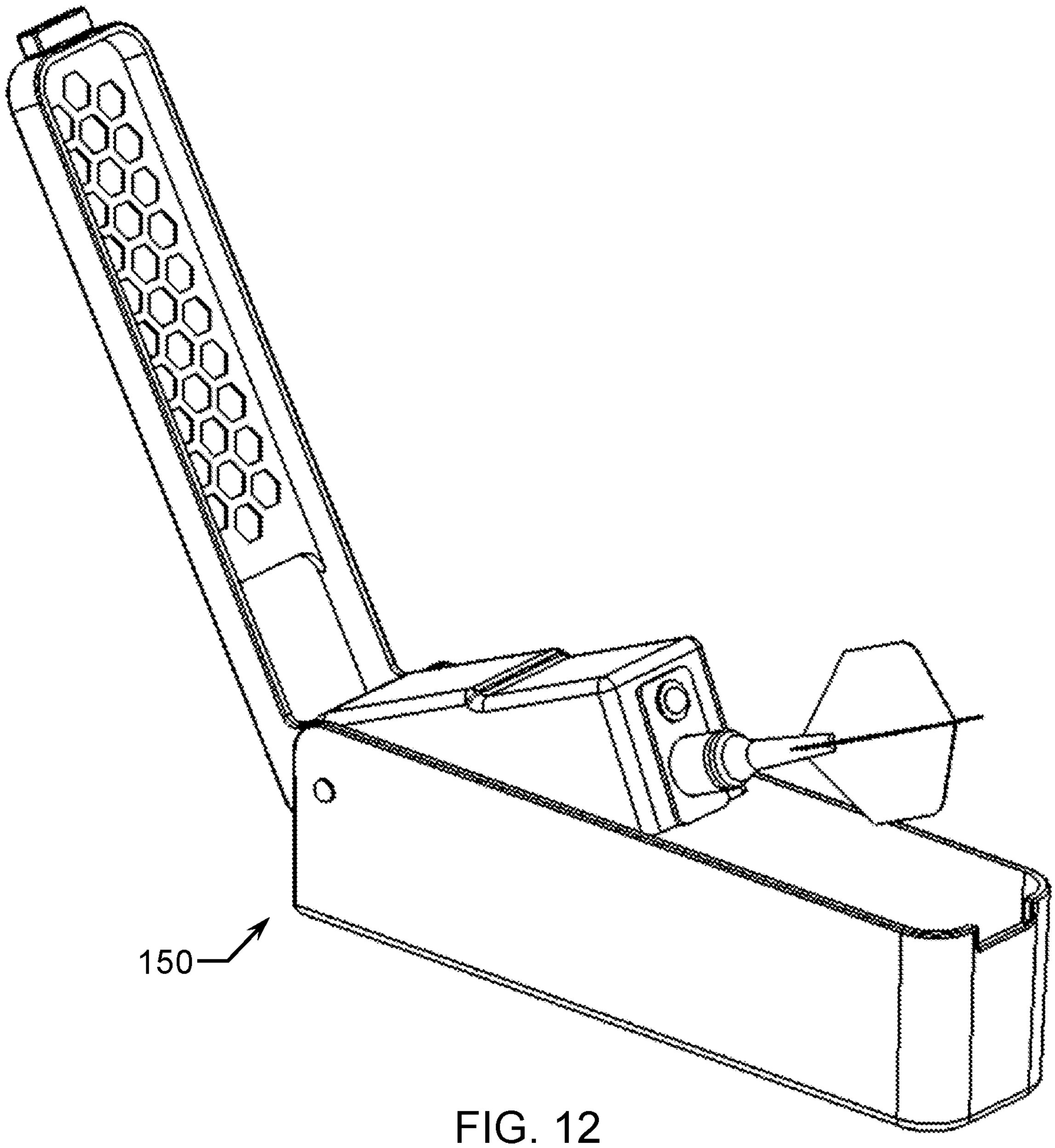
FIG. 12 is an assembled trimetric view of the variable angle single-unit charging case in a un-folded configuration.

Referring now to the drawings, and in particular to FIG. 11 through FIG. 12, in a further additional embodiment of the invention, LEDA 10 is provided in combination with variable angle single-unit charging case apparatus (VASUCCA) 150. VASUCCA 150 is substantially similar to VAMUCCA 140 except that VASUCCA 150 has a singular dart holder.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A laser emitting dart apparatus (LEDA) comprising a dart adapted such that a laser beam is selectively emitted therefrom and such that when said laser beam is projected onto a target, said laser beam provides an indication on said target of where said LEDA is likely to strike said target.

2. The LEDA of claim 1, wherein said LEDA further comprises a capacitive touch switch adapted such that when said capacitive touch switch is touched, said laser beam emits from a tip of said LEDA.

3. The LEDA of claim 1, wherein said LEDA further comprises a rechargeable battery, a PCB, an inductive charging coil, and a capacitive touch switch, and wherein when said capacitive touch switch is touched, said laser beam emits from a tip of said LEDA.

4. The LEDA of claim 3, wherein said LEDA is adapted such that when said LEDA is resting in a charging holder, said LEDA is electrically charged.

5. The LEDA of claim 1, wherein said LEDA is combined with a charging holder is adapted such that when said LEDA is resting on said charging holder, said LEDA is electrically charged.

6. The LEDA of claim 5, wherein said charging holder is adapted such that a plurality of LEDAs may be simultaneously electrically charged.

7. The LEDA of claim 6, wherein an LED of said charging holder is illuminated while said LEDA is charging in said charging holder.

8. A LEDA comprising:

a dart adapted such that a laser beam is selectively emitted therefrom and such that when said laser beam is projected onto a target, said laser beam provides an indication on said target of where said LEDA is likely to strike said target, and a charging case adapted such that when said LEDA is resting thereon, said LEDA is electrically charged.

9. The LEDA of claim 8, wherein said LEDA further comprises a capacitive touch switch adapted such that when said capacitive touch switch is touched, said laser beam emits from a tip of said LEDA.

10. The LEDA of claim 8, wherein said LEDA further comprises a rechargeable battery, a PCB, an inductive charging coil, and a capacitive touch switch, and wherein when said capacitive touch switch is touched, said laser beam emits from a tip of said LEDA.

11. The LEDA of claim 8, wherein said charging holder is adapted such that a plurality of LEDAs may be simultaneously electrically charged.

12. The LEDA of claim 11, wherein an LED of said charging holder is illuminated while said LEDA is charging in said charging holder.

13. A method of using a LEDA comprising providing a LEDA comprising a dart adapted such that a laser beam is selectively emitted therefrom and such that when said laser beam is projected onto a target, said laser beam provides an indication on said target of where said LEDA is likely to strike said target, and causing a laser beam to be selectively emitted from said LEDA such that an indication is illuminated on said target where said LEDA is likely to strike said target, and throwing said LEDA at said target while said target is illuminated by said laser beam.

14. The method of claim 13, wherein said illuminated indication comprises a dot.

15. The method of claim 13, wherein said throwing comprises throwing said LEDA in a substantially straight line from a point of a user's grasp of said LEDA to said illuminated indication on said target.

16. The method of claim 13, wherein said LEDA further comprises a capacitive touch switch adapted such that when said capacitive touch switch is touched, said laser beam emits from a tip of said LEDA, and wherein said method includes the step of touching said capacitive touch switch.

17. The method of claim 13, wherein said LEDA further comprises a rechargeable battery, a PCB, an inductive charging coil, and a capacitive touch switch, and wherein when said capacitive touch switch is touched, said laser beam emits from a tip of said LEDA, and wherein said method includes the step of touching said capacitive touch switch.

18. The method of claim 13, wherein said method includes the step of placing said LEDA in a charging holder, such that said LEDA is electrically charged.

19. The method of claim 18, wherein said charging holder is adapted such that a plurality of LEDAs may be simultaneously electrically charged.

20. The LEDA of claim 19, wherein an LED of said charging holder is illuminated while said LEDA is charging in said charging holder.

* * * * *